United States Patent
Rospierski

(10) Patent No.: US 10,251,518 B2
(45) Date of Patent: Apr. 9, 2019

(54) KEYED DISPENSING CARTRIDGE WITH VALVE INSERT

(71) Applicant: Ecolab USA Inc., St. Paul, MN (US)

(72) Inventor: Jeffrey Rospierski, Alden, NY (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/654,222

(22) Filed: Jul. 19, 2017

(65) Prior Publication Data

US 2017/0311765 A1 Nov. 2, 2017

Related U.S. Application Data

(62) Division of application No. 14/664,534, filed on Mar. 20, 2015, now Pat. No. 9,730,557.

(Continued)

(51) Int. Cl.
*A47K 5/12* (2006.01)
*F16K 21/04* (2006.01)
*F16K 23/00* (2006.01)

(52) U.S. Cl.
CPC ............... *A47K 5/12* (2013.01); *F16K 21/04* (2013.01); *F16K 23/00* (2013.01)

(58) Field of Classification Search
CPC ............ A47K 5/12; F16K 23/00; F16K 21/04
See application file for complete search history.

(56) References Cited

U.S. PATENT DOCUMENTS 2,499,158 A 2/1950 Perry
2,620,061 A 12/1952 Uxa
(Continued)

FOREIGN PATENT DOCUMENTS

AU 467743 B1 10/1972
AU 198178504 1/1981
(Continued)

OTHER PUBLICATIONS

"SolidSense," Kay Chemical Company, 2014(Applicant points out, in accordance with MPEP 609.04(a), that the year of publication, 2014, is sufficiently earlier than the effective U.S. filing date, Mar. 20, 2015, so that the particular month of publication is not in issue.) 2 pp.

(Continued)

*Primary Examiner* — Donnell Long
(74) *Attorney, Agent, or Firm* — Shumaker & Sieffert, P.A.

(57) ABSTRACT

A dispensing system for dispensing cleaning product for hand sanitization comprises a cartridge having an internal reservoir for containing hand sanitization product, a nozzle configured in one of a plurality of key shapes, and a dispenser having a receptacle opening adapted to receive and engage the nozzle of the cartridge when the receptacle opening is configured in one of a plurality of key shapes corresponding to the key shape of the nozzle, the dispenser having a fluid communication passage for dispensing fluid for hand washing, whereby only cartridges and dispensers which have matched key shapes will engage each other for operative discharge of the hand wash cleaning product. The system includes a valve insert member which prevents leakage of fluid unless the nozzle key matches the receptacle opening. The valve insert member is in the form of a cup shaped member of elastomeric material, said member having a curved top having at least one slit having two slit edges, said slit defining a valve which is normally closed when the two slit edges are in mutual contact, but which slit edges separate when the curved top is penetrated, to thereby open the valve. Two slits can be provided in a cross-pattern.

17 Claims, 9 Drawing Sheets

Related U.S. Application Data

(60) Provisional application No. 61/968,173, filed on Mar. 20, 2014.

(56) References Cited

U.S. PATENT DOCUMENTS

| | | |
|---|---|---|
| 2,816,510 A | 12/1957 | Percival |
| 2,853,206 A | 9/1958 | Uxa |
| 3,231,139 A | 1/1966 | Bouet |
| 3,410,455 A | 11/1968 | Haas |
| 3,422,991 A | 1/1969 | MacDougall et al. |
| 3,565,284 A | 2/1971 | Hinterreiter |
| 3,620,413 A | 11/1971 | Borsum |
| 3,628,893 A | 12/1971 | Carpigiani |
| 3,680,736 A | 8/1972 | Viessman |
| 3,764,238 A | 10/1973 | Carpigiani |
| 3,797,701 A | 3/1974 | Alloco et al. |
| 3,844,445 A | 10/1974 | Haas |
| 3,845,882 A | 11/1974 | Haas |
| 3,942,683 A | 3/1976 | Haas |
| 3,968,902 A | 7/1976 | Bachmann |
| 4,000,831 A | 1/1977 | House |
| 4,171,753 A | 10/1979 | Vreede |
| 4,193,745 A | 3/1980 | Hamilton et al. |
| 4,295,580 A | 10/1981 | Amberg |
| 4,311,251 A | 1/1982 | Sternberg |
| 4,322,018 A | 3/1982 | Rutter |
| 4,378,895 A | 4/1983 | Woinarski |
| 4,429,812 A | 2/1984 | Steiner et al. |
| 4,589,575 A | 5/1986 | Rigberg et al. |
| 4,601,645 A | 7/1986 | Schmitkons |
| 4,894,874 A | 1/1990 | Wilson |
| 4,911,331 A | 3/1990 | Sedam |
| 4,948,014 A | 8/1990 | Rutter et al. |
| 4,974,753 A | 12/1990 | Tucker et al. |
| 5,025,516 A | 6/1991 | Wilson |
| 5,071,033 A | 12/1991 | Siwek |
| 5,099,232 A | 3/1992 | Howes |
| 5,100,030 A | 3/1992 | Roggenburg, Jr. et al. |
| 5,178,298 A | 1/1993 | Allina |
| 5,209,377 A | 5/1993 | Steiner et al. |
| 5,240,147 A | 8/1993 | Frazier et al. |
| 5,262,132 A | 11/1993 | Bricker et al. |
| 5,465,877 A | 11/1995 | Bell et al. |
| 5,501,372 A | 3/1996 | Daansen |
| 5,531,363 A | 7/1996 | Gross et al. |
| 5,549,273 A | 8/1996 | Aharon |
| 5,586,573 A | 12/1996 | Nortier |
| 5,836,482 A | 11/1998 | Ophardt et al. |
| 5,875,921 A | 3/1999 | Osgar et al. |
| 5,906,299 A | 5/1999 | Hagleitner |
| 5,931,302 A | 8/1999 | Isaacs et al. |
| 5,944,227 A | 8/1999 | Schroeder et al. |
| 5,992,698 A | 11/1999 | Copeland et al. |
| 6,082,407 A | 7/2000 | Paterson et al. |
| 6,125,482 A | 10/2000 | Foster |
| 6,127,671 A | 10/2000 | Parsons et al. |
| 6,131,773 A | 10/2000 | Wade et al. |
| 6,209,184 B1 | 4/2001 | Copeland et al. |
| 6,230,931 B1 | 5/2001 | Mandle et al. |
| 6,273,296 B1 | 8/2001 | Brown |
| 6,294,786 B1 | 9/2001 | Marcichow et al. |
| 6,401,970 B1 | 6/2002 | Harris et al. |
| 6,412,666 B1 | 7/2002 | Hogan et al. |
| 6,420,737 B1 | 7/2002 | Fan |
| 6,435,372 B1 | 8/2002 | Blacker et al. |
| 6,607,103 B2 | 8/2003 | Gerenraich et al. |
| 6,644,339 B2 | 11/2003 | Gorges et al. |
| 6,758,372 B2 | 7/2004 | Studer et al. |
| 6,877,642 B1 | 4/2005 | Maddox et al. |
| 6,929,154 B2 | 8/2005 | Grey et al. |
| 7,028,861 B2 | 4/2006 | Sayers et al. |
| 7,104,519 B2 | 9/2006 | O'Maley et al. |
| 7,416,357 B2 | 8/2008 | Thiebaut |
| 7,575,022 B2 | 8/2009 | Higgins |
| 7,708,023 B2 | 5/2010 | Thomas et al. |
| 7,967,160 B2 | 6/2011 | Rault et al. |
| 8,020,733 B2 | 9/2011 | Snodgrass |
| 8,071,933 B2 | 12/2011 | Ophardt et al. |
| 8,256,642 B2 * | 9/2012 | McNamara ........ A47G 19/2272 215/11.1 |
| 8,336,740 B1 | 12/2012 | Daansen |
| 8,397,958 B2 | 3/2013 | Smith et al. |
| 8,915,634 B2 | 12/2014 | Hsu et al. |
| 9,126,815 B2 | 9/2015 | Cooper et al. |
| 9,295,350 B2 * | 3/2016 | Smith ................ A47G 19/2272 |
| 2001/0020623 A1 | 9/2001 | McDonough et al. |
| 2002/0092996 A1 | 7/2002 | Fan |
| 2003/0000961 A1 | 1/2003 | Klima et al. |
| 2003/0024941 A1 | 2/2003 | Coleman et al. |
| 2004/0020723 A1 | 2/2004 | Schuman et al. |
| 2005/0067476 A1 | 3/2005 | Hengami |
| 2005/0087552 A1 | 4/2005 | Ciavarella et al. |
| 2005/0139612 A1 | 6/2005 | Matthews et al. |
| 2006/0249536 A1 | 11/2006 | Hartman et al. |
| 2007/0272709 A9 | 11/2007 | Ciavarella et al. |
| 2008/0054018 A1 | 3/2008 | Stechschulte et al. |
| 2008/0277421 A1 | 11/2008 | Zlatic et al. |
| 2008/0283556 A1 | 11/2008 | Snodgrass |
| 2009/0127282 A1 | 5/2009 | Reynolds et al. |
| 2009/0212078 A1 | 8/2009 | Gaus |
| 2010/0163580 A1 | 7/2010 | Ophardt et al. |
| 2010/0294703 A1 | 11/2010 | Hall |
| 2011/0101029 A1 | 5/2011 | Lewis, II et al. |
| 2011/0108578 A1 | 5/2011 | Wegelin et al. |
| 2011/0139808 A1 | 6/2011 | Gatski |
| 2011/0168712 A1 | 7/2011 | Bailey et al. |
| 2011/0168738 A1 | 7/2011 | Nevarez et al. |
| 2011/0210139 A1 | 9/2011 | Limback et al. |
| 2012/0048891 A1 | 3/2012 | Hagleitner |
| 2013/0032613 A1 | 2/2013 | Ciavarella et al. |
| 2013/0036775 A1 | 2/2013 | Brueckner et al. |
| 2013/0292403 A1 | 11/2013 | Cote et al. |
| 2015/0014369 A1 | 1/2015 | Hatton et al. |
| 2015/0265106 A1 | 9/2015 | Rospierski |
| 2016/0038889 A1 | 2/2016 | Freudenberg et al. |
| 2017/0021312 A1 | 1/2017 | Schwartz et al. |

FOREIGN PATENT DOCUMENTS

| | | |
|---|---|---|
| AU | 7850481 | 8/1982 |
| AU | 198769560 | 2/1987 |
| AU | 6956081 | 9/1987 |
| AU | 198778965 | 9/1987 |
| AU | 7896587 | 3/1988 |
| CA | 1067869 | 12/1979 |
| CN | 201023841 Y | 2/2008 |
| CN | 201647398 U | 11/2010 |
| CN | 201686178 U | 12/2010 |
| CN | 102582964 | 7/2012 |
| CN | 202743726 U | 2/2013 |
| DE | 2828062 A1 | 10/1980 |
| DE | 3016834 A1 | 11/1981 |
| DE | 3143953 A1 | 5/1983 |
| DE | 3217739 A1 | 12/1983 |
| DE | 3417751 A1 | 11/1985 |
| DE | 10325233 A1 | 12/2004 |
| DE | 102008059674 A1 | 5/2010 |
| EP | 0166099 A2 | 1/1986 |
| EP | 0281366 A2 | 9/1988 |
| EP | 1995368 A2 | 11/2008 |
| FR | 1224690 | 6/1960 |
| FR | 2335411 A1 | 7/1977 |
| FR | 2449616 A1 | 9/1980 |
| FR | 2851989 A1 | 9/2004 |
| FR | 2871145 A1 | 12/2005 |
| FR | 1913005 | 8/2008 |
| GB | 448886 | 6/1936 |
| GB | 714966 | 9/1954 |
| GB | 871506 | 6/1961 |
| GB | 1067476 | 5/1967 |
| GB | 1086892 | 10/1967 |
| GB | 1505274 | 3/1978 |
| GB | 2122171 | 5/1982 |
| GB | 2361471 | 10/2001 |

(56) References Cited

FOREIGN PATENT DOCUMENTS

| | | |
|---|---|---|
| GB | 2494029 | 2/2013 |
| IT | MI931924 | 3/1995 |
| IT | 1272590 B | 6/1997 |
| JP | 9226855 | 2/1997 |
| JP | 2001158482 | 6/2001 |
| JP | 2008133001 | 6/2008 |
| JP | 4538531 B1 | 9/2010 |
| JP | 2010235194 | 10/2010 |
| JP | 2013141987 | 7/2013 |
| NL | 7901221 | 8/1980 |
| NL | 8204585 | 6/1984 |
| WO | WO8200024 A1 | 1/1982 |
| WO | WO200144077 A1 | 6/2001 |
| WO | WO0185571 A1 | 11/2001 |
| WO | WO0230789 A1 | 4/2002 |
| WO | WO2007039779 A1 | 4/2007 |
| WO | WO2008114177 A1 | 9/2008 |
| WO | WO2009108154 A1 | 9/2009 |

OTHER PUBLICATIONS

"Introducing the KAY SolidSense Cleaning System," Kay Chemical Company, 2008 (Applicant points out, in accordance with MPEP 609.04(a), that the year of publication, 2008, is sufficiently earlier than the effective U.S. filing date, Mar. 20, 2015, so that the particular month of publication is not in issue.) 3 pp.

Sloan Valve Company, "Battery Hand washing faucet—EBF-550," Sloan Optima Systems, Optima Plus EBF-550 S.S.—Rev 3a, Feb. 2011, 2 pp.
ITouchless Housewares & Products, Inc., EZ Faucet Infrared Sensor Faucet Adaptor, retrieved from http://www.itouchless.net/share/cgi-bin/site.cgi?site_id=itouchlessnet&page_id=ezfaucet, on Mar. 15, 2017, 3 pp.
Sloan Valve Company, "Electronic Hand Washing Faucet," Optima ETF-80, Apr. 2014, 2 pp.
Sloan Valve Company, "Electronic Hand Washing Faucet," Optima ETF-600 S.S.—Rev. 2a, Jul. 2012, 2 pp.
Sloan Valve Company, "Electronic Hand Washing Faucet," Optima ETF-610 S.S.—Rev 1c, May 2011, 2 pp.
Sloan Valve Company, "Electronic Hand Washing Faucet," Optima ETF-660 S.S.—Rev 1b, May 2011, 2 pp.
Sloan Valve Company, "Electronic Hand Washing Faucet," Optima ETF-800 S.S—Rev. 0d, Mar. 2012, 2 pp.
Sloan Valve Company, "Electronic Hand Washing Faucet," Optima ETF-880 S.S.—Rev. 0c, May 2011, 2 pp.
Sloan Valve Company, "Electronic Gooseneck Hand Washing Faucet," Optima ETF-500 S.S.—Rev. 2b, May 2011, 2 pp.
Sloan Valve Company, "Electronic Gooseneck Hand Washing Faucet," Optima ETF-700 S.S.—Rev. 2, Nov. 2008, 2 pp.
Sloan Valve Company, "Electronic Gooseneck Hand Washing Faucet," Optima ETF-770 S.S.—Rev 1e, May 2011, 2 pp.
U.S. Appl. No. 15/664,534, filed Mar. 20, 2017, by Rospierski et al.
U.S. Appl. No. 15/589,663, filed May 8, 2017, by Anderson et al.
Prosecution History from U.S. Appl. No. 14/664,534, dated Mar. 11, 2016 through Apr. 12, 2017, 34 pp.

\* cited by examiner

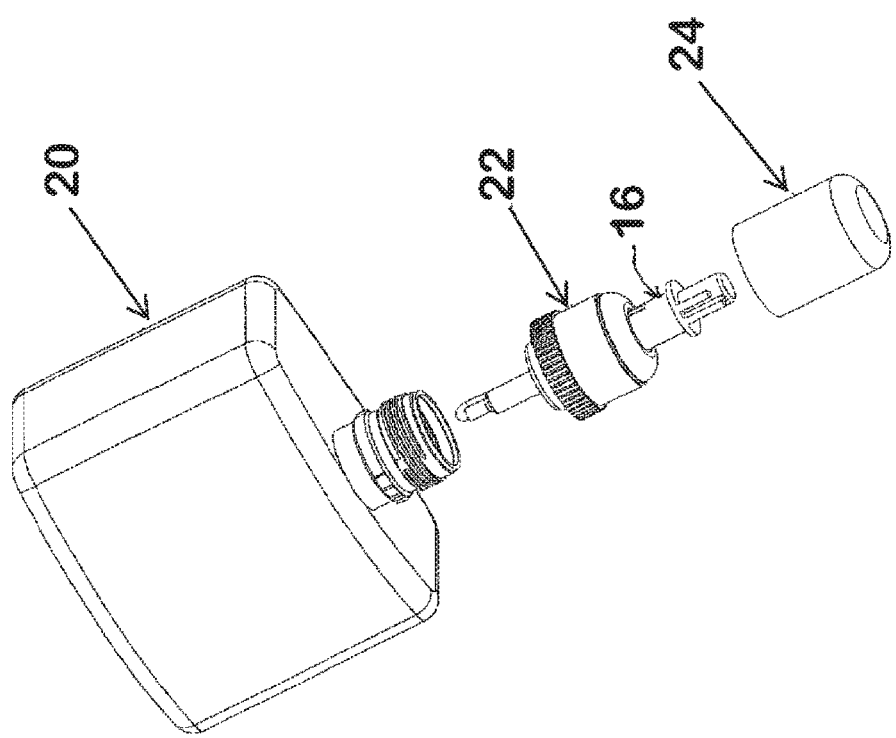

KEYED DISPENSING CARTRIDGE WITH VALVE INSERT

CROSS REFERENCE TO RELATED APPLICATIONS

This application is a divisional of non-provisional U.S. Ser. No. 14/664,534 filed Mar. 20, 2015, which claims the benefit of provisional application Ser. No. 61/968,173 filed Mar. 20, 2014, both of which are incorporated by reference herein. This application also incorporates by reference U.S. Ser. No. 11/803,949 filed May 16, 2007, which is now U.S. Pat. No. 8,020,733.

BACKGROUND

The present invention relates to dispensers designed to dispense a fluid chemical in either a liquid or foam form, and more particularly to keying liquid chemical cartridges to such dispensers. With increased awareness and regulations applying to hygiene especially in the food and healthcare industries, many hygiene systems have been proposed to improve hand hygiene compliance by workers. Many systems use a single product, such as a hand wash soap sanitization product or detergent across all industries and customer applications. Many of the dispensers which dispense product may be refilled by maintenance personnel at the site of the system. The soap or detergent that is used to refill the dispenser may be not optimal or may even be inappropriate for the particular hygiene application, or may not work properly in the dispenser due to the chemical or viscosity characteristics of the product. The pump used to dispense the product may become inoperable due to clogging, which leads to the undesirable result of workers not using any product when hand sanitizing, rendering the operation ineffective for proper hygiene.

SUMMARY

The present disclosure relates to dispensation of hand hygiene products, including a cleaning product dispenser comprising a bottle to contain the cleaning product and a pump assembly that will dispense the product when activated. The product may be a liquid chemical in either liquid or foam form, and as used herein the term "liquid" includes a foam. As used herein the term "cleaning product" or "liquid chemical" also includes hand sanitizers. The container for containing the liquid chemical may be a bottle having a structured size and shape, or it may be a bag having flexible sides such as a bag-in-box configuration In one example, the disclosure is directed to a valve insert member for use in a dispensing system which dispenses cleaning product for hand sanitization, comprising a cup shaped member of elastomeric material, said member having a curved top having at least one slit having two slit edges, said slit defining a valve which is normally closed when the two slit edges are in mutual contact, but which slit edges separate when the curved top is penetrated, to thereby open the valve, and an extension piece extending radially from the cup shaped member along a fraction of the circumference of the cup shaped member, the cup shaped member sized to seat within an index block of a cleaning product dispenser, the curved top of the valve being penetrated by a nozzle of a cleaning product cartridge to permit dispensation of the cleaning product when the nozzle includes key shapes that are accepted into corresponding key slots in the index block.

In another example, the disclosure is directed to a valve insert for a cleaning product dispenser, comprising a normally closed valve member sized to be received into an index block of the cleaning product dispenser and that prevents the cleaning product from being dispensed when the valve member is closed, wherein the valve member includes a main body formed in the shape of a cup and an extension piece extending radially from the cup along a fraction of the circumference of the cup, the index block of the dispenser including at least two key slots, the valve member being opened by a nozzle of a cleaning product cartridge to permit dispensation of the cleaning product from the cleaning product cartridge when the nozzle includes key shapes that are fully received into the at least two key slots in the index block.

Other advantages will become apparent from the drawings and detailed description of a preferred embodiment.

BRIEF DESCRIPTION OF THE DRAWINGS

FIG. 2 is a perspective view of a bottle, pump assembly and overcap;

DETAILED DESCRIPTION

Figure 1A:
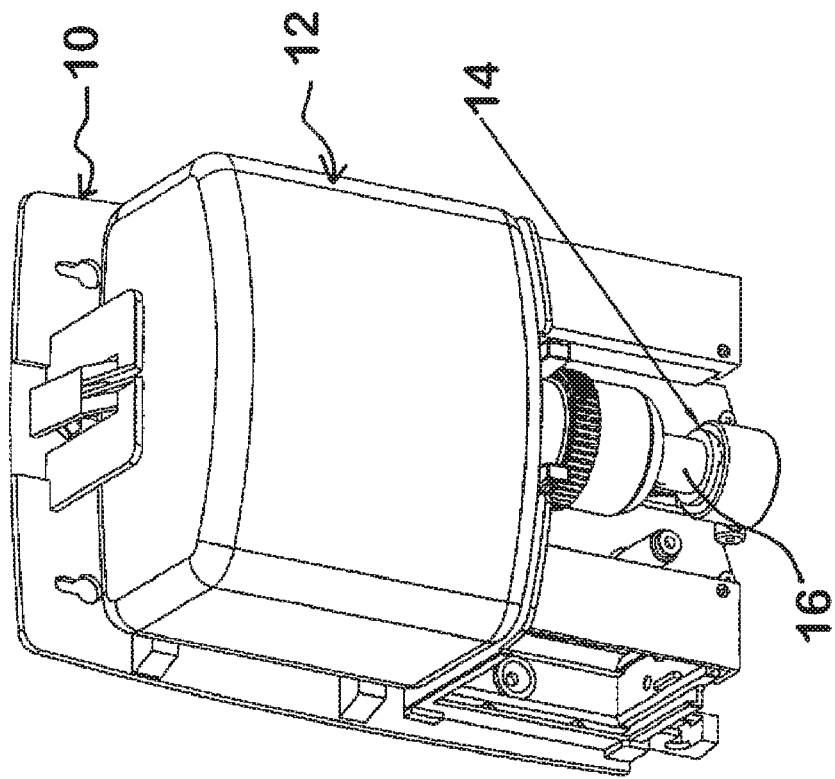
FIGS. 1A and 1B are perspectives view of a dispenser system without (FIG. 1A) and with (FIG. 1B) a bottle cartridge.

A preferred embodiment of the invention will be described, but the invention is not limited to this embodiment.

The present invention provides a dispensing system for dispensing cleaning product for hand washing at a faucet, comprising a cartridge having an internal reservoir for containing hand wash cleaning product, and a nozzle configured in one of a plurality of key shapes; and a dispenser having a block with a receptacle opening adapted to receive and engage the nozzle of the cartridge when the receptacle opening is configured in one of a plurality of key shapes corresponding to the key shape of the nozzle, the dispenser having a fluid communication passage for dispensing fluid for hand washing, whereby only cartridges and dispensers which have matched key shapes will engage each other for operative discharge of the hand wash cleaning product.

The cartridge may comprise a bottle, a flexible bag or a flexible bag in a box. The key shape of the cartridge may comprise at least one radial raised fin located on the exterior of the nozzle. The key shape of the dispenser may comprise at least one radial slot defined in the dispenser block. The key shape of the cartridge may comprise at least two radial raised fins, including at least one index key and one major key. The key shape of the cartridge may comprise at least three radial raised fins, including at least one index key, one major key and one minor key. The index key may extend further along a surface of the nozzle than any other keys, to engage a corresponding radial slot in the dispenser block before any other keys in the cartridge, to thereby align the cartridge rotationally with the dispenser block.

The present invention provides a cartridge for use in a dispensing system for handwashing at a faucet, comprising an internal reservoir for containing hand wash cleaning product, and a nozzle configured in one of a plurality of key shapes, said nozzle adapted to be received by and engage a receptacle opening in a dispenser when the receptacle opening is configured in one of a plurality of key shapes corresponding to the key shape of the nozzle.

The cartridge may comprise a bottle, a flexible bag or a flexible bag in a box. The key shape of the cartridge may comprise at least one radial raised fin located on the exterior of the nozzle. The key shape of the cartridge may comprise at least two radial raised fins, including at least one index key and one major key different in configuration from the index key. The key shape of the cartridge may comprise at least three radial raised fins, including at least one index key, one major key and one minor key, each of said keys being different in configuration from each other. The index key may extend further along a surface of the nozzle than any other keys, to engage a corresponding radial slot in the dispenser block before any other keys in the cartridge, to thereby align the cartridge rotationally with the dispenser block.

The invention provides a cartridge for use in a dispensing system for hand washing at a faucet, comprising an internal reservoir for containing hand wash cleaning product, and a nozzle having at least two radial raised fins having different configurations, said nozzle being adapted to be received by and engage a receptacle opening in a dispenser when the receptacle opening is configured to have radial slots corresponding in shape to the radial raised fins.

The cartridge may have at least three radial raised fins having different configurations.

Figure 1B:
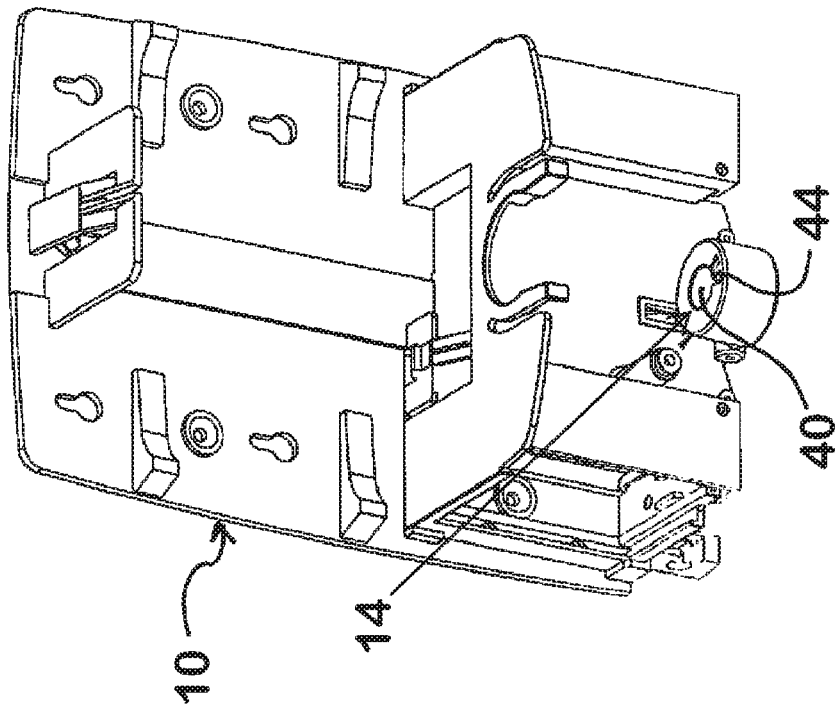

FIG. 1A shows a dispenser 10 without a cartridge, and FIG. 1B shows a dispenser 10 with a cartridge 12.

In FIG. 1B, a keyed index block 14 is adapted to accept and mate with a correspondingly keyed nozzle 16 of a cartridge 12.

FIG. 2 shows the cartridge 12 in more detail. The cartridge 12 comprises a bottle 20 for holding dispensing agent such as liquid handsoap, a pump assembly 22 which may be threaded onto the bottle, and an overcap 24 which protects the nozzle 16 during transport and storage before it is mounted onto the dispenser.

The bottle 20 is in the form of a closed reservoir. The reservoir can be vented or unvented. The bottle may be formed of 1.0 mm thick low density polyethylene (LDPE), high density polyethylene (HDPE), or linear low density polyethylene (LLDPE) allowing it to easily collapse when the liquid chemical content is evacuated and a vacuum is created.

The pump assembly 22 may include an Airspray® L11 (0.75 ml), L9 (1-20 ml), L7 (1.5 ml) or similar piston pump. The pump is designed to dispense a liquid in the form of foam but versions are available that do not create foam. Accordingly, the option of foam or non-foam may be made by the user or as dictated by the hygiene application.

The nozzle 16 provides an activation interface between the pump assembly 22 and dispenser 10. The nozzle 16 also serves to direct the stream of chemical being dispensed.

The pump assembly 22 may be attached to a plastic flexible bag to provide a bag-in-box style cartridge configuration. This bottle variation has a collar with a bottle neck with a 5.0 mm flange. The collar will attach to the pump assembly 22 in the same way as the bottle 20. The flange provides a surface that can be used to form an ultrasonic weld between the bag and the collar.

The preferred embodiment has a mechanical keying arrangement between the cartridge 12 and dispenser 10. The keying arrangement may be in the form of a key on one of the cartridge 12 and dispenser 10, and a key hole on the other. The key hole may be located on the part of the dispenser called the index block 14, as shown in FIG. 1. The index block 14 holds and lifts the pump nozzle 16. When the dispenser is activated (which may be by powered means powered by a battery), the index block 14 will rise pushing the nozzle 16 into the pump assembly causing the pump to dispense cleaning product.

Figure 3:
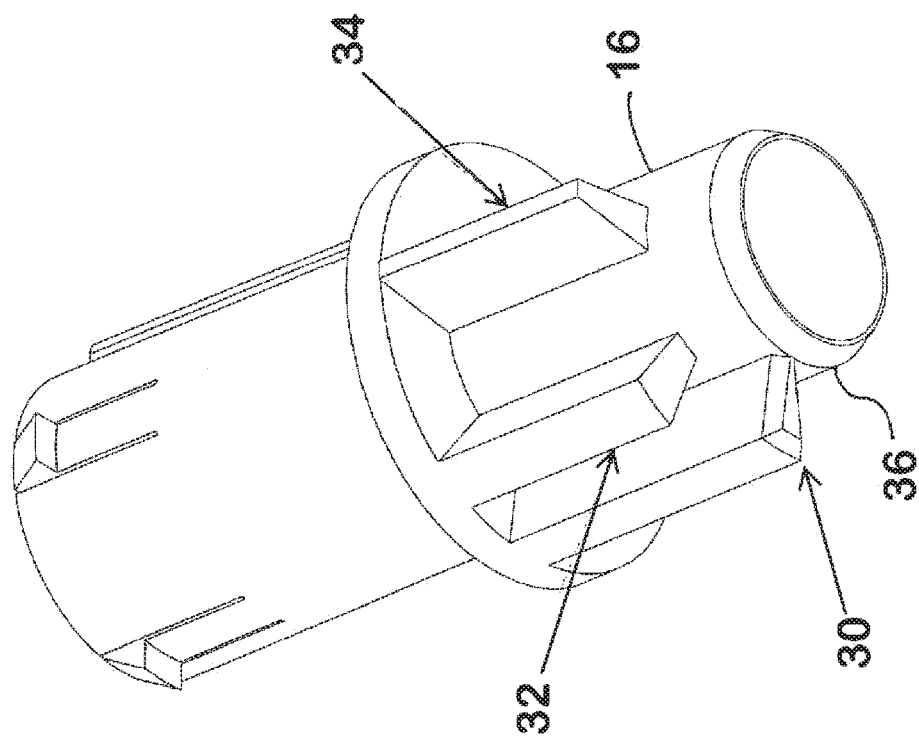
FIG. 3 is a perspective view of an embodiment of a cartridge nozzle having a key arrangement.

As shown in FIG. 3, the nozzle 16 has a tip 36 at one end through which cleaning product exits, and at the other end a plurality of tangs which lock into a bottle or bag.

As shown in FIG. 3, the cartridge nozzle 16 has a key in the form of an index key 30, a major key 32 and a minor key 34. For the cartridge nozzle 16 to mate with the dispenser index block 14, the cartridge nozzle 16 should be aligned so that the index, major and minor keys are aligned with corresponding index, major and minor keyholes in the index block 14, while the central shaft of the nozzle 16 is aligned in the central opening 40 in the index block 14. The index, major and minor keys are in the form of radial fins, and the index, major and minor keyholes are in the form of radial slots 44 radiating the central opening 40 in the block. Only two slots 44 are shown in FIG. 1A.

Figure 4:
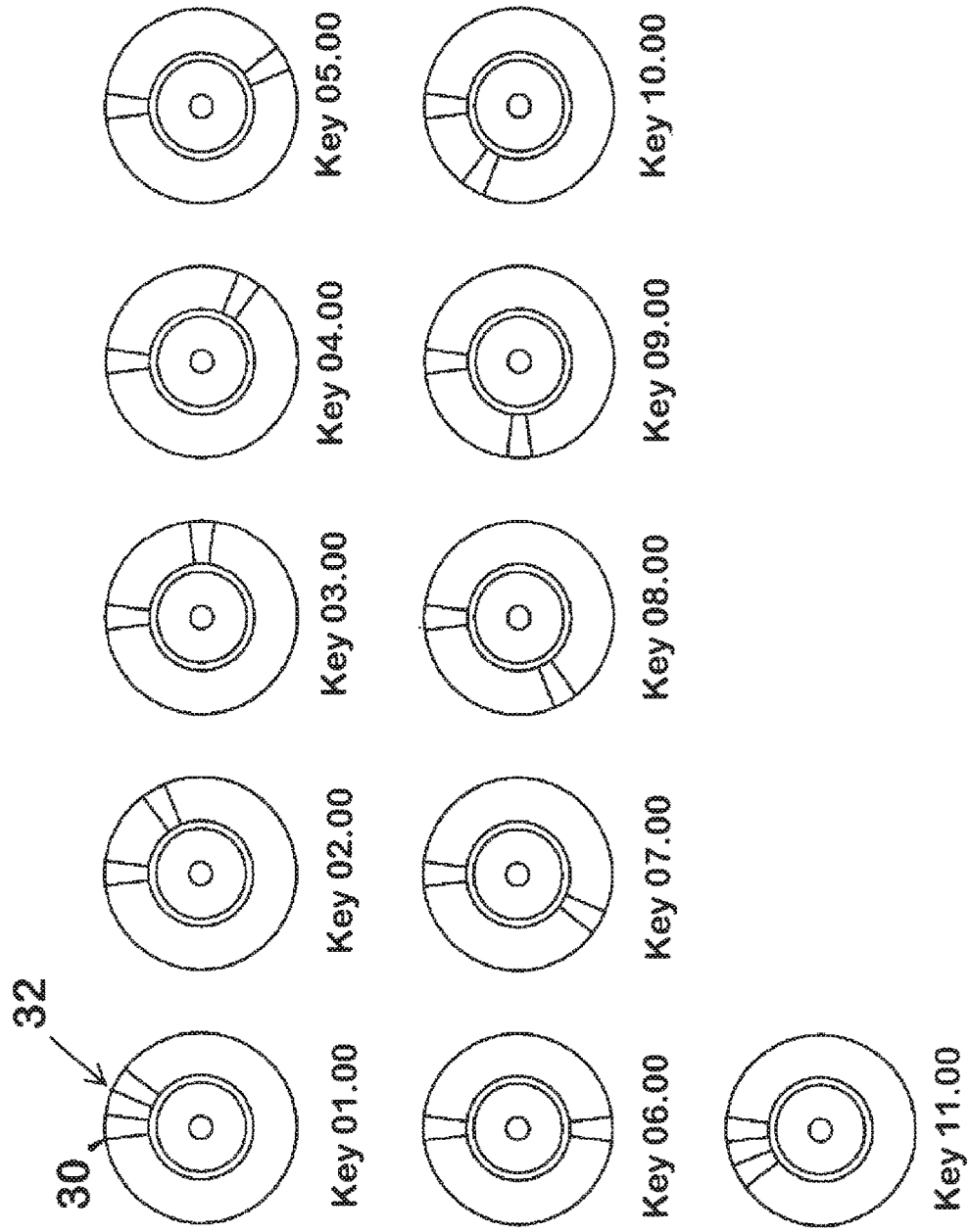
FIG. 4 is a top plan view of different major key configurations which may be used.
Figure 5:
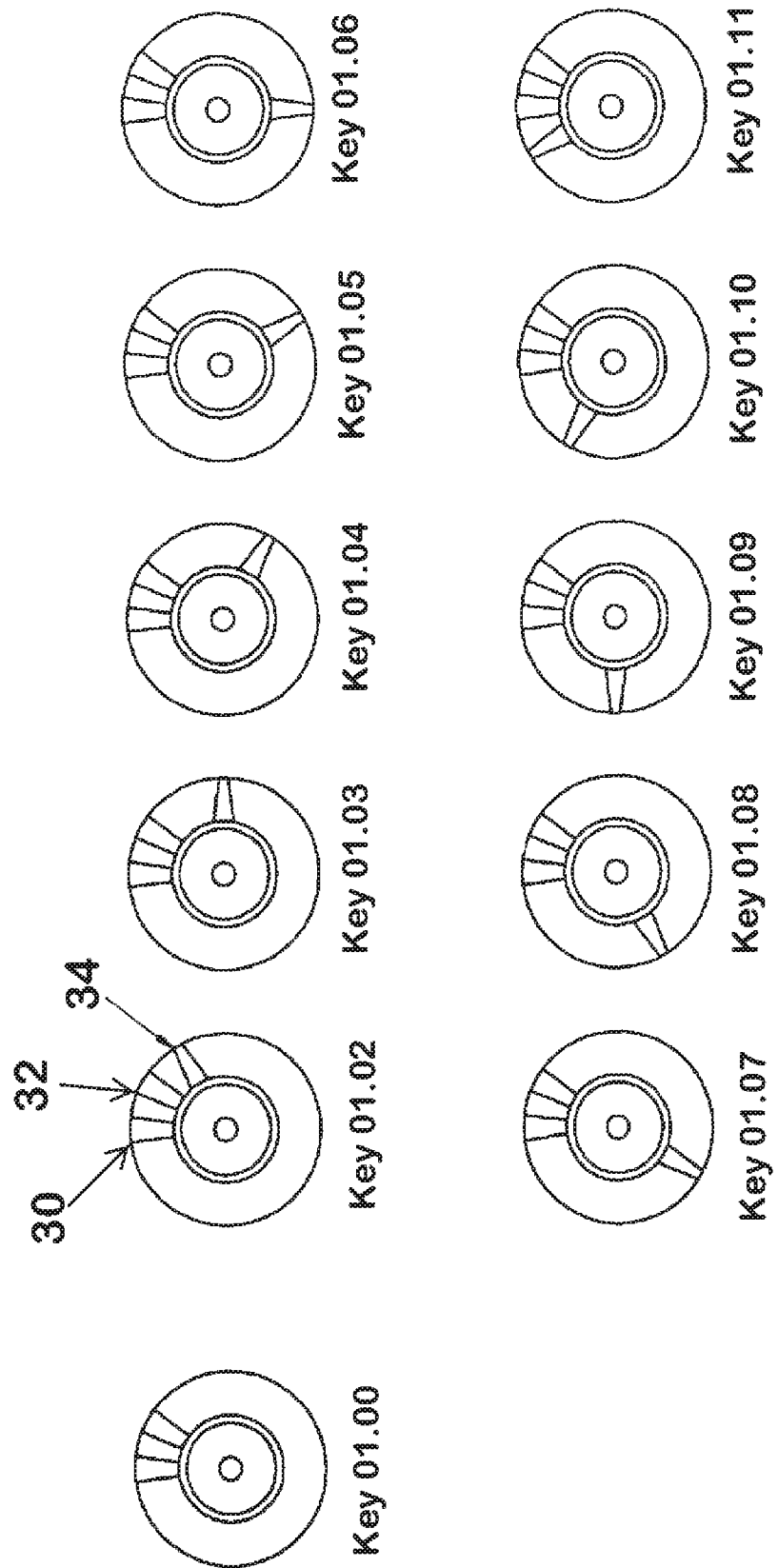
FIG. 5 is a top plan view of different minor key configurations which may be used.

The key arrangement may have many different forms as shown in FIGS. 4 and 5. One way is to have an index key 30 and at least one major key 32. The key arrangement may also have at least one minor key 34. The keys will be described in the context of the nozzle 16, it being understood that the dispenser index block 14 will have corresponding key holes or slots to accept the keys of the cartridge nozzle 16 for cartridges that are compatible with the hand washing application and/or other needs or desires of the customer. The index key 30 may have a central location such as that shown in the 12 o'clock position in FIGS. 4 and 5, and is used to orient the nozzle 16 and index block 14 so that the other key elements will align properly. FIG. 3 shows the index key 30 being longer than the major key 32 and minor key 34, so the index key 30 will be the first key to be inserted into its corresponding keyhole or slot in the index block 14. The remaining major key(s) 32 and minor key(s) 34 may have different locations for each application or customer, making the customer's keying arrangement unique to that customer.

As shown in FIGS. 4 and 5, the key elements may be positioned around the nozzle and index block in regular fixed increments such as 30° increments, corresponding in position to the number locations on an analog clock. The key locations can thus be referred to by the "hours" position. One key code format that could be used is XX.xx, where XX is the major key location and xx is the minor key location. If no minor key is used, the key code format may be XX-00. Major key position 01 may be reserved by the manufacturer or distributor of the system, with the remaining ten locations (02-11) available for customer assignment. For example, the key code for the cartridge nozzle/index block arrangement in FIG. 3 would be 01.03.

As described above, each customer may be assigned a unique major key. The distributor of the system may charge the customer a fee for tooling the unique key location for that customer. The nozzles of the dispensers for that customer will thus be uniquely keyed for that customer.

The customer may have the option of using one or more of the minor key positions, thereby allowing the customer to differentiate within their product line. For example, a customer having major key 02 may assign 02.01 to dispensers having standard hand soap and 02.03 to dispensers for surgical hand soap. Because the keying of the nozzles and dispensers are different for the two soap products, the standard hand soap would be unable to be installed in a soap dispenser for a hospital surgery room, for example.

It is possible for a customer to have more than one major key and/or more than one minor key. For example, if a customer has one major and two minor keys, the keying will be designated $XX.x_{1}x_{1}.x_{2}x_{2}$. The dispenser will accept nozzles having $XX.x_{1}x_{1}$ or $XX.x_{2}x_{2}$ keys.

As shown in FIG. 3, a major key 32 and a minor key 34 may have different shapes to differentiate their status as major or minor. The major key 32 has sides which are along radial lines originating at the center of the nozzle, so that the key becomes wider as one moves radially outward. The minor key 34, has sides in an opposite arrangement so that the key becomes narrower as one moves radially outward.

FIGS. 4 and 5 show example key arrangements for major key locations and minor key locations. It should be understood that the key elements may have configurations and locations other than those shown in the figures as described above.

In some cases, users will load or try to load an unmatching dispenser into the index block, and sometimes the dispenser will discharge fluid.

The present invention provides a mechanism to prevent dispensing of fluid if an unmatched dispenser is inserted into the index block. The invention provides a lock-out valve inserted into the index block. The valve is normally closed. If an unmatching dispenser is inserted into the index block, because the key codes do not match, the nozzle will not be fully seated in the index block, and the valve will remain closed, preventing the flow of dispenser fluid, as intended.

If the dispenser key matches the index block, the nozzle will be fully seated and the lock-out valve will open, permitting the flow of dispenser fluid as intended.

A preferred embodiment of a lock-out valve comprises a cup shaped insert made of resilient material having a normally closed valve, which opens when a nozzle tip reaches the valve. The resilient material can be silicone.

Figure 6:
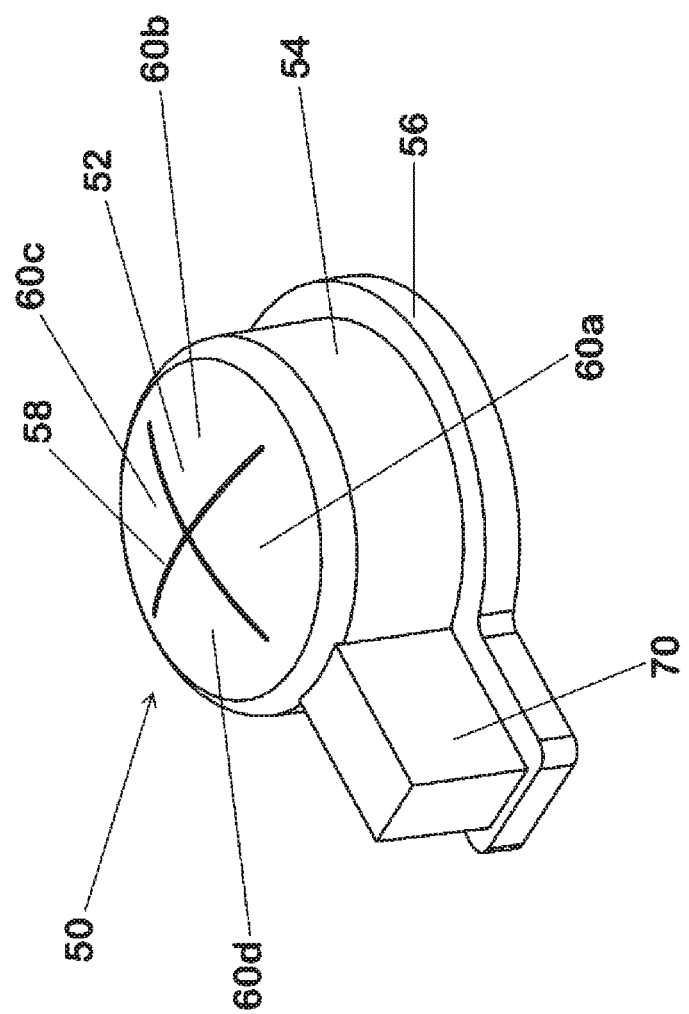
FIG. 6 is a perspective view of a valve member.

FIG. 6 shows the valve member in the form of a cup shaped insert 50 having a rounded or domed top surface 52, downwardly depending skirt 54 and an enlarged ring 56 at the bottom of the skirt. The rounded top surface or dome has at least one slit, or slot 58. FIG. 6 shows two such slits or slots in a cross-pattern to form four quadrants 60a, 60b, 60c and 60d. The valve member has an extension piece 70 extending radially from the cap shaped insert along a fraction of its circumference. The fraction can be about 1/20, or 18°, for example.

Figure 7:
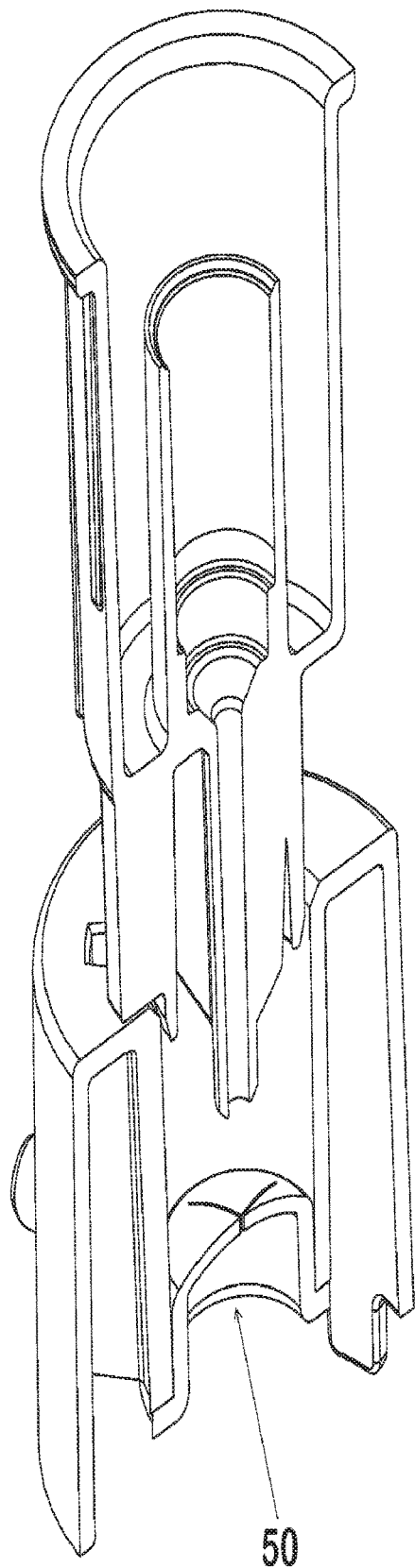
FIG. 7 is a perspective view, in cross-section, of the valve member received in a receptacle opening and a nozzle whose key shape does not match the key shape of the receptacle, so that the nozzle is not fully seated to open the valve in the valve member.

FIG. 7 shows a valve inserted into an index block, and a nozzle tip of an unmatching dispenser inserted into the index block. It can be seen that the nozzle tip does not reach the valve to open the valve. If fluid product does flow from the nozzle, it may reach the top surface of the valve, but will not flow past the valve because the valve is normally closed. If the valve were not present, fluid product from the unmatching dispenser may leak through the index block and be dispensed.

Figure 8:
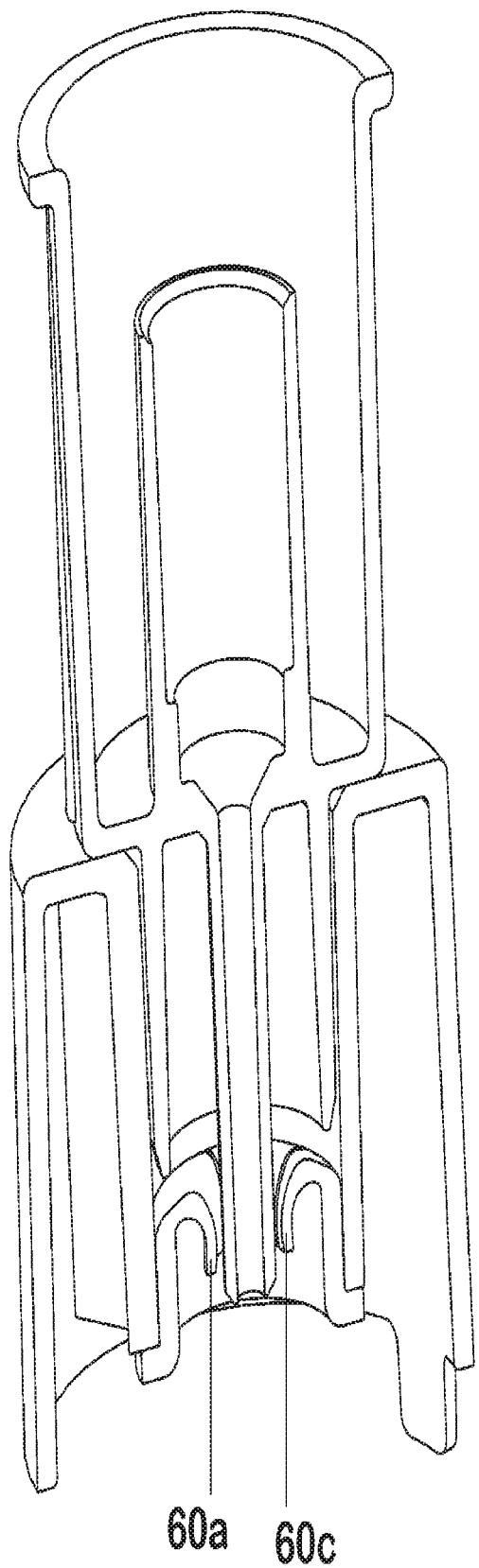
FIG. 8 is a perspective view, in cross-section, like that of FIG. 7, but wherein the key-shapes of the corresponding members match, so the nozzle extends through the valve member.

FIG. 8 shows a matching dispenser for the index block. Due to the match, the nozzle will fully seat in the index block, and the nozzle tip will push through the slits or slots 58 in the valve member pushing the four quadrants 60a, 60b, 60c and 60d of the dome downward like flaps, and thereby opening a flow path through the index block. Subsequent removal of the nozzle and nozzle tip will result in closure of the valve, because the flaps of the four quadrants of the dome will return to the position in FIG. 6.

Figure 9:
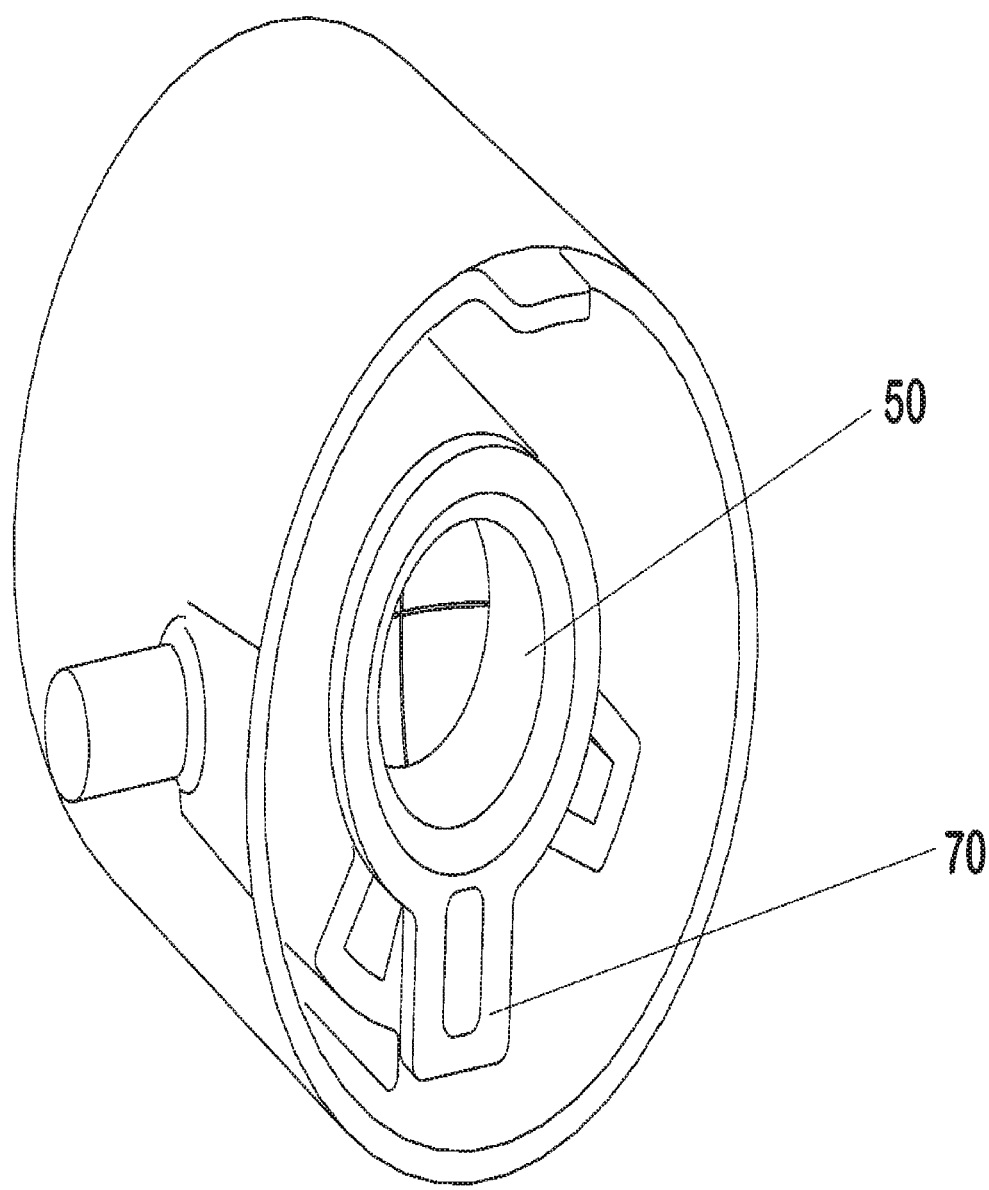
FIG. 9 is a perspective view of the bottom of the receptacle, with the valve member fully seated in the receptacle.

FIG. 9 shows a perspective view of the bottom of the index block with the cup shaped insert fully seated in the index block. The radially extending extension piece 70 is used to help hold the valve in the index block. The valve can be glued permanently in place, or it can be removable, wherein the piece 70 enables one to grasp the insert and extract it from the index block for cleaning and/or replacement.

Although one preferred embodiment has been described and shown in the drawings, variations will occur to those skilled in the art. The invention is not limited to the preferred embodiment and its scope is defined only by the claims.

The invention claimed is:

1. A valve insert member for use in a cleaning product dispenser which dispenses a cleaning product, comprising:
a cup shaped member of elastomeric material, said member having a curved top having at least one slit having two slit edges, said slit defining a valve which is normally closed when the two slit edges are in mutual contact, but which slit edges separate when the curved top is penetrated, to thereby open the valve; and
an extension piece extending radially from the cup shaped member along a fraction of the circumference of the cup shaped member,
the cup shaped member sized to seat within an index block of the cleaning product dispenser, the index block further including a receptacle opening having one or more key slots to axially receive and engage a nozzle of a cleaning product cartridge having one or more key shapes corresponding to the key slots in the index block, such that the curved top of the valve is penetrated by the nozzle of the cleaning product cartridge to open the valve and permit dispensation of the cleaning product through the nozzle.

2. The member of claim 1, wherein the valve member comprises an elastomeric material of silicone.

3. The member of claim 2, wherein the valve member comprises a generally domed shape insert having a plurality of slits.

4. The member of claim 3, wherein the valve member has two slits.

5. The member of claim 4, wherein the slits are in a cross-pattern.

6. The member of claim 1, wherein the valve insert further includes skirt extending downwardly from the curved top and an enlarged diameter ring at a lower edge of the skirt.

7. The member of claim 1, wherein the fraction is about 1/20.

8. The member of claim 1, wherein the cup shaped member is sized to seat within the index block of the cleaning product dispenser such that when the nozzle includes key shapes that are not accepted into the key slots in the index block, the curved top of the valve is not penetrated by the nozzle of the cleaning product cartridge and the valve remains closed, thus preventing dispensation of the cleaning product.

9. A valve insert for a cleaning product dispenser, comprising:
a normally closed, cup shaped valve member sized to be received into an index block of the cleaning product dispenser and that prevents the cleaning product from being dispensed when the valve member is closed, wherein the valve member includes a main body formed in the shape of a cup and an extension piece extending radially from the cup along a fraction of the circumference of the cup,
the index block of the dispenser including a receptacle opening having at least two key slots to fully receive and engage a nozzle of a cleaning product cartridge having one or more key shapes corresponding to the key slots in the index block,
the cup shaped valve member sized to seat within the receptacle of the index block such that the valve member is opened by the nozzle of the cleaning product cartridge to permit dispensation of the cleaning product from the cleaning product cartridge when the nozzle includes key shapes that are fully received into the at least two key slots in the index block.

10. The valve insert of claim 9, wherein the valve member comprises a cup shaped insert.

11. The valve insert of claim 9, wherein the valve member comprises an elastomeric material.

12. The valve insert of claim 11, wherein the elastomeric material includes silicone.

13. The valve insert of claim 9, wherein the valve member comprises a generally domed top surface having at least one slit across the dome which is normally closed.

14. The valve insert of claim 13, wherein domed top surface has at least two slits forming a cross-pattern.

15. The valve insert of claim 9, wherein the valve member comprises a cup shaped insert having a rounded top surface, a downwardly depending skirt and an enlarged diameter ring at a lower edge of the skirt.

16. The valve insert of claim 9, wherein the fraction is about 1/20.

17. The valve insert of claim 9, wherein when the nozzle includes key shapes that are not fully received into the at least two key slots in the index block, the valve member is not opened by the nozzle of the cleaning product cartridge, thus preventing dispensation of the cleaning product from the cleaning product cartridge.

* * * * *